United States Patent
Fang et al.

(10) Patent No.: US 10,140,034 B2
(45) Date of Patent: Nov. 27, 2018

(54) SOLID-STATE DRIVE ASSIGNMENT BASED ON SOLID-STATE DRIVE WRITE ENDURANCE

(71) Applicant: International Business Machines Corporation, Armonk, NY (US)

(72) Inventors: Min Fang, Shanghai (CN); Jian Ying Hu, Guang Dong (CN)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 14/950,483

(22) Filed: Nov. 24, 2015

(65) Prior Publication Data
US 2017/0147237 A1 May 25, 2017

(51) Int. Cl.
G06F 3/06 (2006.01)
G06F 12/02 (2006.01)
G06F 11/00 (2006.01)

(52) U.S. Cl.
CPC .......... *G06F 3/0616* (2013.01); *G06F 3/0647* (2013.01); *G06F 3/0688* (2013.01); *G06F 11/008* (2013.01); *G06F 12/0246* (2013.01); *G06F 2212/7211* (2013.01)

(58) Field of Classification Search
CPC .......... G06F 3/647; G06F 3/616; G06F 3/649; G06F 3/653; G06F 3/67; G06F 3/0646–3/0649; G06F 3/0688; G06F 12/0246; G06F 12/00–12/16; G06F 2212/72–2212/7211

See application file for complete search history.

(56) References Cited

U.S. PATENT DOCUMENTS

| | | | |
|---|---|---|---|
| 8,006,061 B1* | 8/2011 | Chatterjee | G06F 3/0605 711/170 |
| 8,370,597 B1* | 2/2013 | Chatterjee | G06F 3/0604 707/651 |
| 9,678,677 B2* | 6/2017 | Grimsrud | G06F 3/0616 |
| 2006/0069886 A1* | 3/2006 | Tulyani | G06F 3/0605 711/161 |
| 2011/0010488 A1 | 1/2011 | Aszmann et al. | |
| 2011/0066792 A1* | 3/2011 | Shaeffer | G06F 12/0246 711/103 |
| 2011/0258363 A1* | 10/2011 | Doatmas | G06F 3/0616 711/103 |
| 2013/0124780 A1* | 5/2013 | Baderdinni | G06F 3/061 711/103 |
| 2013/0246722 A1* | 9/2013 | Suzuki | G06F 3/0608 711/162 |
| 2014/0122776 A1 | 5/2014 | El Maghraoui et al. | |

(Continued)

*Primary Examiner* — Nicholas J Simonetti
(74) *Attorney, Agent, or Firm* — Daniel R. Simek

(57) ABSTRACT

A method for managing data storage. The method included a processor identifying a plurality of first utilization values for data within a first data storage system, wherein the data includes a plurality of extents and the plurality of first utilization values corresponds to the plurality of extents are included in the data. The method further includes a processor transferring the data from the first data storage system to a second data storage system, wherein the second data storage system includes a plurality of solid-state drives (SSDs). The method further includes a processor storing the transferred data among the plurality of SSDs based, at least in part on, the plurality of first utilization values.

17 Claims, 6 Drawing Sheets

(56) References Cited

U.S. PATENT DOCUMENTS

2014/0189196 A1\* 7/2014 Kelkar .................... G06F 12/16
   711/102
2014/0281168 A1\* 9/2014 Koseki ................. G06F 11/108
   711/103
2014/0351504 A1\* 11/2014 Kawaba ................ G06F 3/0685
   711/113
2015/0046664 A1   2/2015 Fitzpatrick et al.
2016/0196075 A1\* 7/2016 Matsushita ......... G06F 12/0246
   711/103

\* cited by examiner

400

| EXTENT # | 401 | 402 | 403 | 404 | 405 | 406 | 407 | 408 | 409 | 410 | 411 | 412 | 413 | 414 | 415 | 416 |
|---|---|---|---|---|---|---|---|---|---|---|---|---|---|---|---|---|
| WPD-HDD | 80 | 20 | 60 | 10 | 10 | 10 | 90 | 70 | 55 | 20 | 80 | 50 | 50 | 90 | 90 | 70 |

441 / 442

444 ← 445

| EXTENT # | 407 | 414 | 415 | 401 | 411 | 408 | 416 | 403 | 409 | 412 | 413 | 402 | 410 | 404 | 405 | 406 | |
|---|---|---|---|---|---|---|---|---|---|---|---|---|---|---|---|---|---|
| WPD-HDD | 90 | 90 | 90 | 80 | 80 | 70 | 70 | 60 | 55 | 50 | 50 | 20 | 20 | 10 | 10 | 10 | 855 |

450

| SSD # | 420 | 421 | 422 | 423 | 435 | 436 | 437 |
|---|---|---|---|---|---|---|---|
| DWEV % | 26.75% | 22.63% | 21.60% | 20.58% | 3.29% | 3.09% | 2.06% |
| EXTENT # | 407 | 414 | 415 | 401 | 402 | 410 | 404 |
| EXTENT # | 411 | 408 | 416 | 403 | 405 | 406 | |
| EXTENT # | 412 | 409 | 413 | | | | |
| Δ UTIL. % | -0.43 | 1.93 | 2.96 | -4.20 | 0.22 | 0.42 | -0.89 |

Δ UTIL. STD — 2.12% (453)

454

| SSD # | 420 | 421 | 422 | 423 | 435 | 436 | 437 |
|---|---|---|---|---|---|---|---|
| EXTENT # | 407 | 408 | 414 | 401 | 402 | 410 | 404 |
| EXTENT # | 411 | 416 | 415 | 412 | 405 | 406 | |
| EXTENT # | 409 | 403 | | 413 | | | |
| Δ UTIL. % | -0.43 | 0.76 | -0.55 | 0.48 | 0.22 | -0.75 | 0.28 |

Δ UTIL. STD — 0.53% (455)

FIG. 4a

| EXTENT # | 407 | 414 | 415 | 401 | 411 | 408 | 416 | 403 | 409 | 412 | 413 | 402 | 410 | 404 | 405 | 406 |  |
|---|---|---|---|---|---|---|---|---|---|---|---|---|---|---|---|---|---|
| WPD-SSD | 72 | 76.5 | 76.5 | 80 | 80 | 77 | 77 | 72 | 71.5 | 65 | 65 | 20 | 20 | 10 | 10 | 10 | 882.5 |

460 ⟵ 461, 462, 463

| SSD # | 420 | 421 | 422 | 423 | 435 | 436 | 437 |
|---|---|---|---|---|---|---|---|
| DWEV % | 27.56% | 20.94% | 24.04% | 18.74% | 3.23% | 2.91% | 2.58% |
| EXTENT # | 407 | 408 | 414 | 401 | 402 | 410 | 404 |
| EXTENT # | 411 | 416 | 415 | 412 | 405 | | 406 |
| EXTENT # | 409 | 403 | | 413 | | | |
| Δ UTIL. % | -2.23 | 4.68 | -6.70 | -5.07 | 0.17 | -0.64 | -0.32 |
| | | | | | | | Δ UTIL. STD |
| | | | | | | | 3.74% |

470, 471, 473

| SSD # | 420 | 421 | 422 | 423 | 435 | 436 | 437 |
|---|---|---|---|---|---|---|---|
| EXTENT # | 411 | 407 | 403 | 401 | 402 | 404 | 410 |
| EXTENT # | 415 | 412 | 409 | 408 | 405 | 406 | |
| EXTENT # | 416 | 413 | 414 | | | | |
| Δ UTIL. % | -1.09 | 1.96 | 0.89 | -0.94 | 0.17 | -0.65 | -0.31 |
| | | | | | | | Δ UTIL. STD |
| | | | | | | | 1.02% |

SOLID-STATE DRIVE ASSIGNMENT BASED ON SOLID-STATE DRIVE WRITE ENDURANCE

BACKGROUND OF THE INVENTION

The present invention relates generally to the field of computer storage systems, and more particularly to distributing data among solid-state drives within a computer storage system.

With the evolution of applications that process large amounts of data (e.g., Big Data Analytics applications), high-performance and dynamic storage is becoming a necessity. Support for high-performance data analysis is a key ingredient, especially in enterprise systems. To provide fast data access (and thereby quick analysis), many enterprise systems use Solid-State Disks (SSDs), also referred to as solid-state drives.

Solid-state drives are advantageous over hard disk drives (HDDs) because SSDs have no moving parts. Thus, SSDs are not as fragile as HDDs. In addition, because SSDs have no mechanical delay, SSDs are not subject to the relatively lengthy access times, seek times, and latency to which HDDs are subject. For this reason, SSDs are usually much faster than HDDs. A significant drawback of SSDs, however, is a relatively high cost associated with SSDs compared to HDDs.

One type of SSD is based on non-volatile memory (e.g., flash memory). Flash memory stores information in memory cells that are made from floating-gate transistors. The nature of the floating gate transistors of a memory cell contributes to another drawback for SSDs. Whereas flash memory may exhibit a virtually unlimited ability to be read, writing data to flash memory is limited. Suppliers of SSDs rate SSD drives with respect to an endurance for a warranty period, such as X drive-writes per day (DWPD) for 5 years. DWPD refers to the number of times that the entire capacity of a SSD can be overwritten each and every day of the specified warranty period before the SSD degrades below warrantied specifications. Commodity and/or read-intensive SSDs can have endurance ratings in the range of 0.3 to 5 DWPD. High-endurance SSDs for enterprise systems and/or write intensive applications, such as analytics, aerospace applications, and high-performance computing can have endurance ratings in the range of 20 to 45 DWPD. Another endurance definition that may be used is terabyte written (TBW).

SUMMARY

According to aspects of the present invention, there is a method, computer program product, and/or system for managing data storage. In an embodiment, the method included one or more computer processors identifying a plurality of first utilization values for data within a first data storage system, wherein the data includes a plurality of extents and the plurality of first utilization values corresponds to the plurality of extents included in the data. The method further includes one or more computer processors transferring the data from the first data storage system to a second data storage system, wherein the second data storage system includes a plurality of solid-state drives (SSDs). The method further includes one or more computer processors storing the transferred data among the plurality of SSDs based, at least in part on, the plurality of first utilization values.

BRIEF DESCRIPTION OF THE DRAWINGS

FIG. 4a depicts an illustrative example of the distribution of extents, comprising a data source, among solid-state drives based on the utilization of the extents on another storage system, in accordance with an embodiment of the present invention.

FIG. 4b depicts an illustrative example of the redistribution of extents, comprising a data source, among solid-state drives based on the utilization of the data while the data was stored on the solid-state drives, in accordance with an embodiment of the present invention.

DETAILED DESCRIPTION

Figure 1:
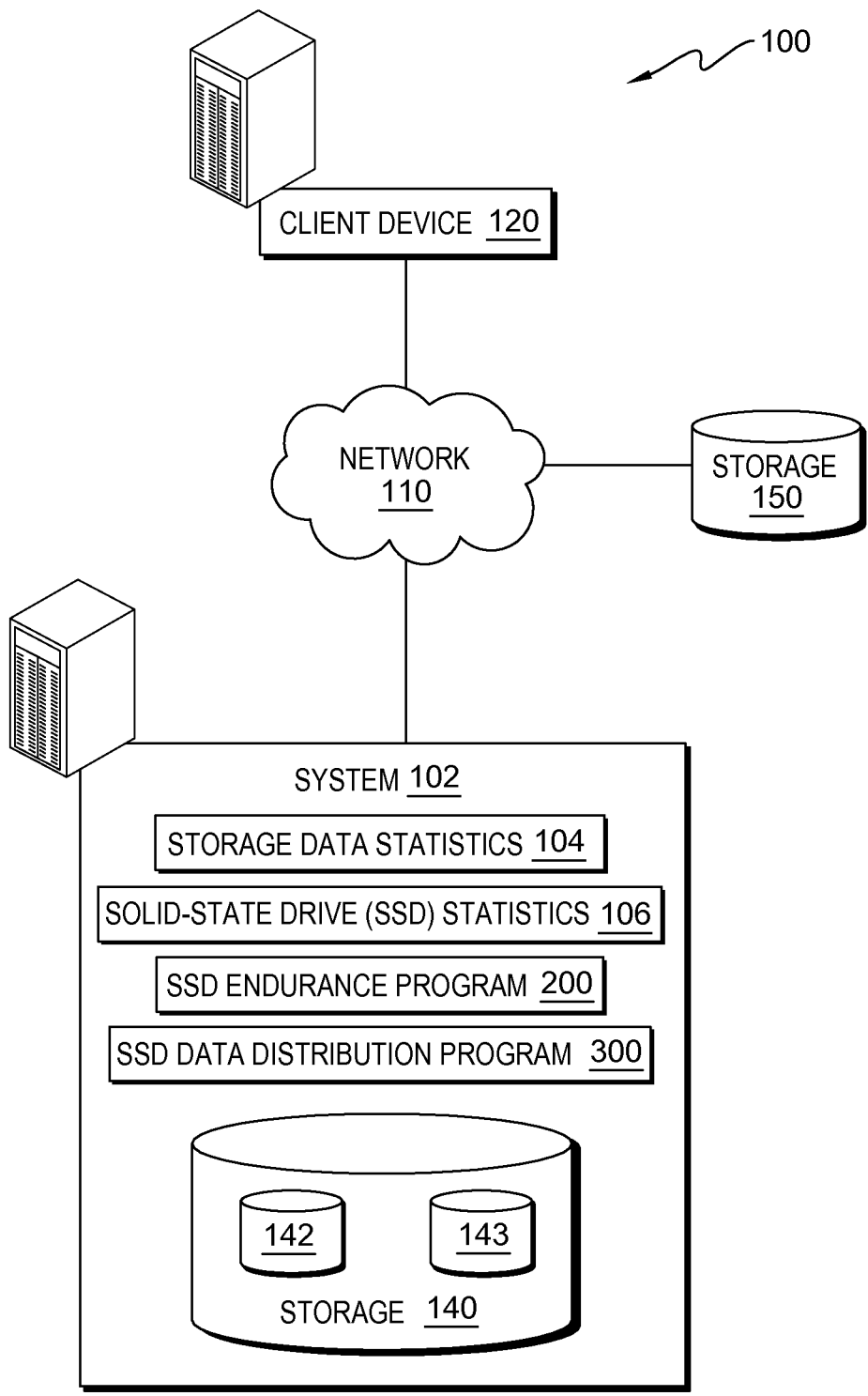
FIG. 1 illustrates a distributed computing environment, in accordance with an embodiment of the present invention.

Embodiments of the present invention recognize that in a distributed computing environment, large volumes of information can be stored on systems (e.g., storage solutions) that are optimized for data storage, such as a network-attached storage (NAS) systems and/or storage area networks (SANs). Each type of storage medium has associated cost and performance trade-offs. Tape backup systems can provide a low-cost, large-volume storage solution; however, magnetic tapes have a significant access delay. Solid-state drives (SSDs), based on flash memory, are one of the highest performance storage solutions; however, SSDs are more expensive and may need to be replaced more frequently than hard disk drives. The semiconductor gates that comprise SSDs degrade (resulting in, e.g., slower erase times) in response to write operations. Various technologies (e.g., wear leveling) exist that move data to different locations within a SSD to avoid hot spots (e.g., high intensity write operation locations). Some technologies are integrated within the firmware of a SSD. In addition, a SSD may be configured with additional flash memory above the capacity rating for that SSD. In an example, a portion of the extra capacity (e.g., sectors of flash memory) is allocated to replace sectors of flash memory that wear out. Other technologies monitor data files as singular entities when determining whether data is write-intensive, read-intensive, or some intermediate rating.

Embodiments of the present invention recognize that storage solutions can be comprised of a plurality of SSDs, and the plurality of SSDs may be further comprised of groups of SSDs of different drive-writes per day (DWPD) endurance ratings. For example, static system data or fixed variable data may be stored on SSDs rated at 0.5 DWPD, cold data may be stored on SSDs rated at 5 DWPD, and hot data may be stored on SSDs rated at 30 DWPD. Data may be distributed among the plurality of SSDs based on cost and wear considerations.

Embodiments of the present invention utilize a more granular approach, such as analyzing extents comprising a data file or database, and obtaining a heat rating (e.g., data utilization statistics, data modification statistics, etc.) for each extent prior to migrating the extents to SSDs. Embodiments of the present invention utilize a heat rating corresponding to an extent to assign a storage location (e.g., a SSD) for the extent during data migration to protect SSDs rated for read-intensive operations (e.g., "cold" data) from storing a "hot" extent. Hot data may be identified as data or portions of a data file (e.g., segments, extents, blocks) that are frequently modified (e.g., updated, deleted, added, etc.) by a write operation. The write operation may be preceded by an erase operation, or the write operation may utilize a portion of memory that was previously erased. Cold data is data, or portions of a data file, that experience little to no modification. Warm data is data, or portions or data, that experience a level of modification between the defined hot data rating and cold data rating.

Various software applications are available to generate heat maps of data. Some heat maps (e.g., heat index maps) of data provide quantitative values for heat maps of data. Embodiments of the present invention utilize the quantitative values to rank (e.g., sort) extents within each heat rating (e.g., hot, warm, and cold). Embodiments of the present invention introduce a concept of extent write utilization (EWU). One embodiment of the present invention defines EWU information with respect to a measure (e.g., quantity) of write operations per day (e.g., bandwidth) that corresponds to each extent comprising data migrated (e.g., transferred) to a SSD based storage system (e.g., storage tier). Further embodiments of the present invention monitor the heat maps of the data stored among the SSDs to determine whether the EWU of the stored extents change and/or the write endurance values for the plurality of SSDs change, such that SSD assignments dictate an optimization (e.g., rebalancing).

In addition, embodiments of the present invention may apply heat ratings to describing SSDs. SSDs with the highest endurance values may be allocated to a group of hot SSDs. Highly worn (e.g., degraded, low endurance value) SSDs may be reassigned to a group of cold SSDs. An endurance value for a SSD may be expressed as a percentage with respect to an array of SSDs (e.g., hot, warm, and cold combined) or with respect to one group of SSDs (e.g., hot SSDs). The endurance value for a SSD may be expressed as write operations per unit of time, such as writes/hour or writes/day.

Embodiments of the present invention are described with respect to data comprised of extents. Some file systems can define space within a storage device (e.g., HDD, SSD, etc.) with respect to extents of a constant (e.g., fixed) size. Data of other file systems can be comprised of extents of varying sizes. One definition of an extent is a physical chunk of storage space on a storage device (e.g., logical volume) that can be expressed as megabytes (MB) and as multiples of two, such as 2 MB, 4 MB, 32 MB, 64 MB, etc. Another definition of an extent is a set of contiguous blocks allocated in a database. In addition, embodiments of the present invention are not limited to one flash memory technology as opposed to another flash memory technology, such as NAND and NOR; and/or single-level cell (SLC), multi-level cell (MLC), and triple-level cell (TLC) devices.

The present invention will now be described in detail with reference to the Figures. FIG. 1 is a functional block diagram illustrating distributed computing environment 100, in accordance with an embodiment of the present invention. In an embodiment of the present invention, distributed computing environment 100 includes: system 102, network 110, client device 120, and storage 150.

Many modifications to the depicted environment may be made by those skilled in the art without departing from the scope of the invention as recited by the claims.

System 102, client device 120, and storage 150 may be laptop computers, tablet computers, netbook computers, personal computers (PC), desktop computers, personal digital assistants (PDA), smart phones, wearable devices (e.g., digital eyeglasses, smart glasses, smart watches, personal fitness devices, personal safety devices), or any programmable computer systems known in the art. In certain embodiments, system 102, client device 120, and storage 150 represent computer systems utilizing clustered computers and components (e.g., database server computers, application server computers, etc.) that act as a single pool of seamless resources when accessed through network 110, as is common in data centers and with cloud-computing applications. In general, system 102 and storage 150 are representative of any programmable electronic device or combination of programmable electronic devices capable of executing machine readable program instructions and communicating with users of client device 120 via network 110. System 102, client device 120, and storage 150 may include components, as depicted and described in further detail with respect to FIG. 5, in accordance with embodiments of the present invention.

System 102 includes: storage data statistics 104, solid-state drive (SSD) statistics 106, SSD endurance program 200, SSD data distribution program 300, and potentially various other programs and databases (e.g., a data heat index mapping program, a storage management program, mathematical and/or statistical programs, a database management system, etc.) (not shown). In various embodiments, system 102 may be a network-attached storage (NAS) system or a storage area network (SAN). In one embodiment, system 102 also includes storage 140, which is comprised of a plurality of SSD storage devices. In an embodiment, the SSDs that comprise storage 140 are based on flash memory as opposed to random-access memory (RAM). In some embodiments, storage 140 may be identified as a Tier-0 storage solution. In some embodiments, system 102 is a storage solution that also includes storage 150. In another embodiment, system 102 includes additional storage devices, such as hard disk drives (HDDs), other SSDs, and/or memory (e.g., RAM, flash, etc.) that cache data received via network 110.

Storage data statistics 104 includes information stored in a non-SSD storage tier and/or another storage system. In one embodiment, storage data statistics 104 includes utilization information for data stored within storage 150. In some embodiments, storage data statistics 104 includes EWU information for data stored within storage 150 that is comprised of extents. In other embodiments, storage data statistics 104 includes write-utilization information for data that is comprised of other storage formats, such as segments, blocks, tracks, etc. In other embodiments, storage data statistics 104 also includes historical information, metadata, access information, data heat-index maps, etc. In another embodiment, storage data statistics 104 includes non-SSD based storage information for one or more storage systems included in system 102, such as storage 140.

In various embodiments, storage data statistics 104 includes a plurality of rules and/or criteria related to data storage and/or data utilization. In one scenario, storage data statistics 104 may include criteria that may be used to define a heat definition (e.g., hot, warm, cold) associated with a data structure (e.g., extents) that comprise data. In another scenario, storage data statistics 104 may include one or more rules that determine when data is migrated from a non-SSD storage tier to a SSD based storage tier. For example, storage data statistics 104 may include a rule that modifies the heat rating of data based on a priority rating associated with an application (e.g., client), such as a rule that warm data at a high priority is processed as if the warm data is rated as hot data. In another example, storage data statistics 104 may include one or more rules that dictate which portion of a data file (e.g., which extents) are migrated from storage 150 to storage 140. In an example, storage data statistics 104 includes a rule that dictates that each extent comprising an accessed data file is migrated to storage 140. In another example, storage data statistics 104 includes a rule that dictates that extents with EWU information greater than a threshold level are migrated to storage 140.

SSD statistics 106 includes information related to the plurality of SSDs that comprise storage 140. Information within SSD statistics 106 may include: warranty data for each SSD (e.g., DWPD endurance rating), drive write endurance values (DWEV) for each SSD, percentage DWEV values for each SSD with respect to the total DWEV for a group of SSDs, data utilization values (e.g., EWU information, extent heat ratings, etc.) for active data stored within storage 140, and distribution of data (e.g., extent assignments), etc. DWEV may be defined as an estimated remaining DWPD of a SSD with respect to an original DWPD endurance rating that is degraded by write operations. DWEVs continually change (e.g., decrease) as a SSD executes write operations for data (e.g., extents) stored on the SSD.

In some embodiments, SSD statistics 106 includes one or more rules that manage how and/or when various analyses of storage utilization, EWU information, and/or SSD utilization are performed. In one scenario, SSD statistics 106 includes a rule that permits an over-utilization percentage, for a SSD, when determining which combination of extents are assigned to a SSD. In another scenario, SSD statistics 106 includes a rule that may determine the frequency (e.g. period) for analyzing and/or updating EWU information (e.g., write bandwidth) corresponding to extents stored on SSDs, such as determining one or more utilization trends. In an example, SSD statistics 106 includes a rule that dictates that EWU information is based on a trend, such as an exponential moving average (EMA) algorithm that is executed at six-hour intervals while data (e.g., extents) resides on one or more SSDs. In another example, SSD statistics 106 includes another rule that dictates that EWU information is defined with respect to writes per day (WPD).

In various scenarios, SSD statistics 106 includes a rule that dictates calculating a standard deviation (STD) corresponding to the variation (e.g., delta) between the relative drive write endurance value (DWEV %) for each SSD of the SSDs that store extents and a total WPD of the extents stored on each SSD. SSD statistics 106 may include an additional rule that defines a threshold (e.g., tolerance) associated with a delta utilization STD (Δ UTIL. STD) value. In one example, SSD statistics 106 includes a rule that dictates, if the Δ UTIL. STD value is greater than 2%, then initiate a reassignment of extents (e.g., via SSD data distribution program 300). In another example, SSD statistics 106 may include a rule that states, if a Δ UTIL. STD value for a current utilization analysis period is greater than the Δ UTIL. STD value during a prior utilization analysis period, by a factor of four or more, execute a rebalancing algorithm for the SSDs storing the data. In an alternative embodiment, SSD statistics 106 may include rules that determine when a SSD is migrated to another group. For example, if a SSD that stores hot extent data is sufficiently degraded (e.g., has reduced DWPD endurance), then the SSD is removed from a group of SSDs assigned to hot data and migrated to a group of SSDs assigned to store warm data.

SSD statistics 106 may include one or more rules that determine whether information (e.g., extents) related to a received data is defined as hot data, warm data, cold data, and/or demoted data. In one embodiment, SSD statistics 106 interfaces with and/or receives data from a data heat-index mapping application of storage 150. In one embodiment, SSD statistics 106 interfaces with and/or receives data from a data heat-index mapping application on system 102. For example, SSD statistics 106 may include a rule that dictates that data (e.g., one or more extents) is demoted from storage 140 to storage 150 based on a span of time during which the data (e.g., one or more extents) is determined to have a utilization value below a minimum utilization threshold.

Storage 140 is a storage solution comprised of a plurality of SSDs. In one example, a plurality of SSDs that comprise storage 140 include SSD#420, 421, 422, 423, 435, 436, and 437 as depicted in tables 450 and 454 of FIG. 4a. In one embodiment, storage 140 is comprised of two or more groups of SSDs, such as storage 142 and storage 143. In some embodiment, each group of SSDs is comprised of SSDs with similar DWPD endurance ratings. In one scenario, storage 142 is comprised of SSDs with endurance ratings of 20 DWPD, and storage 143 is comprised of SSDs with endurance ratings of 3 DWPD. In another scenario, each group of SSDs may include a range of endurance ratings based on the heat index of data stored. For example, hot data is stored on SSDs with endurance ratings of 20 to 45 DWPD, warm data is stored on SSDs with endurance ratings of 5 to 15 DWPD, and cold data is stored on SSDs with endurance ratings of 0.5 to 3 DWPD. In an example, storage 142 is designated to store hot data, and storage 143 is designated to store cold data. In another example, storage 142 is comprised of SSD#420, 421, 422, and 423; and storage 143 is comprised of SSD#435, 436, and 437. In an alternative embodiment, storage 140 is comprised of SSDs that begin with similar initial endurance ratings; however, after a period of time, the SSDs of storage 140 are separated into groups (e.g., storage 142 and storage 143) based on a calculated remaining DWPD endurance value (e.g., an initial DWPD endurance rating minus DWPD consumed by write operations) corresponding to a SSD. In an example, storage 142 is utilized to store write (operation) intensive data, and storage 143 is utilized to store read (operation) intensive data.

In various embodiments, storage 140 includes a cache (not shown) that buffers data received via network 110 (e.g., from storage 150). In an example, storage 140 includes a cache based on one or more HDDs. In another example, storage 140 includes a cache based on one or more SSDs. Storage 140 may cache a received data while SSD data distribution program 300 determines SSD assignments for the plurality of extents that comprise the received data.

In an embodiment, storage 150 is a storage solution, such as a SAN or a NAS solution. In some embodiments, storage 150 is based on HDDs, such as high performance HDDs (e.g., Tier-1 storage) and/or medium performance HDDs (e.g., Tier-2 storage). In an alternative embodiment, storage 150 may include low performance storage and/or archival media, such as backup magnetic tapes (e.g., Tier-3 storage). Storage 150 may include: a data heat index mapping application, a website interface, one or more mathematical and/or statistical programs, a database management system (not shown), etc. In various embodiments, storage 150 may utilize one or more mathematical and/or statistical programs to determine the EWU information (e.g., write operation bandwidth) for data stored on storage 150. In one embodiment, storage 150 maintains EWU information within an internal database (not shown). In another embodiment, storage 150 communicates EWU information with system 102 via network 110.

SSD endurance program 200 determines a storage capacity and an endurance value corresponding to each SSD within storage 140, in accordance with an embodiment of the present invention. SSD endurance program 200 also groups the SSDs of storage 140 based on the corresponding endurance values of the SSDs and subsequently sorts (e.g., ranks) the SSDs within a group of SSDs based on the corresponding endurance values of SSDs of a group, in accordance with an embodiment of the present invention. SSD endurance program 200 may execute concurrently with SSD data distribution program 300. In some embodiments, SSD endurance program 200 continually updates the endurance values for each SSD of a group of SSDs (e.g., storage 142 and storage 143) based on EWU information obtained from SSD data distribution program 300. In various embodiments, SSD endurance program 200 periodically updates the DWEVs for each SSD within SSD statistics 106. In other embodiments, SSD endurance program 200 may constrain (e.g., restrict) the grouping and sorting of SSDs to occur on a periodic basis (e.g., weekly, during maintenance activities, etc.). In an example, SSD endurance program 200 may utilize one or more rules defined within SSD statistics 106 to determine the periodicity (e.g., frequency) of SSD grouping and/or sorting. In various embodiments, SSD endurance program 200 may initiate sorting SSDs based in one or more interactions with SSD data distribution program 300.

SSD data distribution program 300 determines which SSDs store one or more extents that comprise a received data, in accordance with embodiments of the present invention. In one embodiment, SSD data distribution program 300 analyzes EWU information that corresponds to extents that comprise a received data. In another embodiment, SSD data distribution program 300 determines assignments (e.g., SSDs) for extents that comprise a received data based on the analysis of the SSD utilization data. In some embodiment, SSD data distribution program 300 periodically reanalyzes the extent assignments based on EWU information corresponding to extents stored on SSDs. In other embodiments, SSD data distribution program 300 may re-assign one or more extents to other SSDs, based on one or more criteria (e.g., rules) included with SSD statistics 106. In some embodiments, multiple instances of SSD data distribution program 300 may execute concurrently and interface with respective instances of SSD endurance program 200. In addition, SSD data distribution program 300 may update SSD statistics 106.

Figure 2:
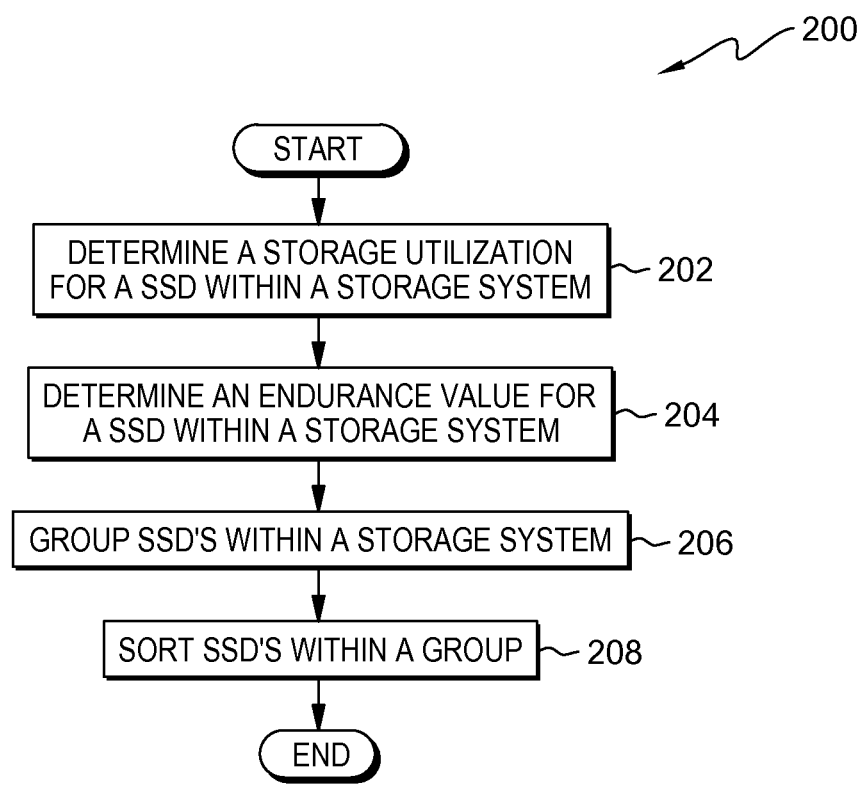
FIG. 2 depicts a flowchart of the operational steps of a solid-state drive endurance program, in accordance with an embodiment of the present invention.

FIG. 2 is a flowchart depicting operational steps for SSD endurance program 200, a program that determines the endurance values for a plurality of SSDs of a data storage system, in accordance with embodiments of the present invention. In addition, SSD endurance program 200 groups the plurality of SSDs based one or more criteria, and SSD endurance program 200 subsequently sorts the grouped SSDs by the endurance values that correspond to the grouped SSDs. In various embodiments, SSD endurance program 200 and SSD data distribution program 300 may execute concurrently. In some embodiments, multiple instances of SSD endurance program 200 execute concurrently, in addition the multiple instances of SSD endurance program 200 may utilize one or more of the same SSDs to store one or more extents of a group of extents of a different data source (e.g., data file, data records, etc.).

In step 202, SSD endurance program 200 determines a storage utilization for a SSD within a storage system. In one embodiment, SSD endurance program 200 determines a storage capacity of a SSD with respect to a physical storage capacity associated with the SSD and an amount of data that is stored on the SSD from a prior data transfer (e.g., migration). In another embodiment, SSD endurance program 200 determines a storage utilization, such as a relative drive write endurance value (DWEV %). In one scenario, SSD endurance program 200 determines a DWEV % based on an endurance value corresponding to a SSD divided by the total of the endurance values corresponding to SSDs that comprise a group. In another scenario, SSD endurance program 200 determines a DWEV % based on an endurance value corresponding to a SSD divided by the total of the endurance values corresponding to SSDs that comprise an array of SSDs (e.g., storage 140, a subset of SSDs of storage 140, etc.). In a further embodiment, SSD endurance program 200 determines a storage utilization based on a plurality of data (e.g., data sets, data files, data records) that are migrated from a storage system (e.g., storage 150) to a plurality of SSDs that comprise storage 140.

In an embodiment, each instance of SSD endurance program 200 communicates storage utilization information among the other instances of SSD endurance program 200 executing on system 102. In an example, each executing instance of SSD endurance program 200 includes storage utilization data in a corresponding area within storage data SSD statistics 106; however, SSD statistics 106 may also include a shared area where storage utilization data is aggregated for a plurality of instances of SSD endurance program 200. In some embodiments, SSD endurance program 200 determines a storage utilization for a SSD based on the number of extents that a SSD can store. For example, a 1 GB SSD can store 500, 2 MB extents.

In step 204, SSD endurance program 200 determines an endurance value for a SSD within a storage system. An endurance value is an estimated remaining DWPD for a SSD based on the original endurance rating of the SSD reduced (e.g., degraded, consumed) by a plurality of write operations, converted to DWPD equivalents, that are executed on the SSD. For example (referring to FIG. 4b, tables 460 and 470), based on the calculated EMA (e.g., WPD-SSD) for extents 401 through 416 inclusively (i.e., 401, 402, 403, 404, 405, 406, 407, 408, 409, 410, 411, 412, 413, 414, 415, and 416), the endurance value associated with SSD#420 decreases by 223.5 writes per day (WPD) for each execution of an application that utilizes the data that includes extent#407, 411, and 409 stored on SSD#420. In one embodiment, SSD endurance program 200 determines an endurance value for a SSD based on historical write operations that executed on the SSD. In another embodiment, SSD endurance program 200 determines an endurance value for a SSD based on EWU information determined for each extent stored on the SSD. In some embodiments, SSD endurance program 200 obtains EWU information corresponding to stored extents from SSD data distribution program 300 (referring to FIG. 3, step 308).

In step 206, SSD endurance program 200 groups the SSDs within a storage system. In one embodiment, SSD endurance program 200 groups the SSDs that comprise storage 140 into two groups: storage 142 for storing hot extents and storage 143 for storing cold extents. In another embodiment, SSD endurance program 200 may group the SSDs that comprise storage 140 into three or more groups. In some embodiments, SSD endurance program 200 groups the SSDs that comprise storage 140 by an initial (e.g., original) DWPD endurance rating. In other embodiments, SSD endurance program 200 may group the SSDs that comprise storage 140 based on a current endurance value corresponding to each SSD of the SSDs that comprise storage 140. In an example, SSD endurance program 200 may determine that an endurance value for a SSD, which was previously in a hot data group, degrades sufficiently to be removed from a hot data group and assigned to a warm data group of SSDs.

In an alternative embodiment, SSD endurance program 200 may determine that storage 140 includes additional groups of SSDs based on one or more other factors. In one example, SSD endurance program 200 may determine that different data is comprised of different extent allocations (e.g., sizes), such as 16 MB as opposed to 64 MB. SSD endurance program 200 may identify two groups of SSDs, one group of SSDs is designated for storing data comprised of 16 MB extents (e.g., hot data SSDs and cold data SSDs); and another group of SSDs is designated for storing data comprised of 64 MB extents (e.g., hot data SSDs and cold data SSDs). Each group of SSDs may include sub-groups of SSDs for hot data and cold data.

In step 208, SSD endurance program 200 sorts the SSDs within a group. In one embodiment, SSD endurance program 200 sorts each group of SSDs in descending order with respect to a DWPD availability percentage, wherein the DWPD availability percentage is based on the total of the endurance values of a group of SSDs. In an example, a DWPD availability percentage for a SSD may be expressed as: DWPD $\%_i = \text{DWPD}_{avail,i}/(\Sigma_1^N \text{DWPD}_{avail})$. In another embodiment, SSD endurance program 200 sorts each group of SSDs in descending order with respect to the endurance value of the SSD.

In an alternative embodiment, SSD endurance program 200 may base DWPD availability percentage on combining the SSD endurance values of two or more groups. In an example (referring to FIG. 4a, table 450), row 451 depicts the percentage of the total drive write endurance value percentage (DWEV %) associated with each SSD (e.g., SSD#420, 421, 422, 423, 435, 436, and 437).

Figure 3:
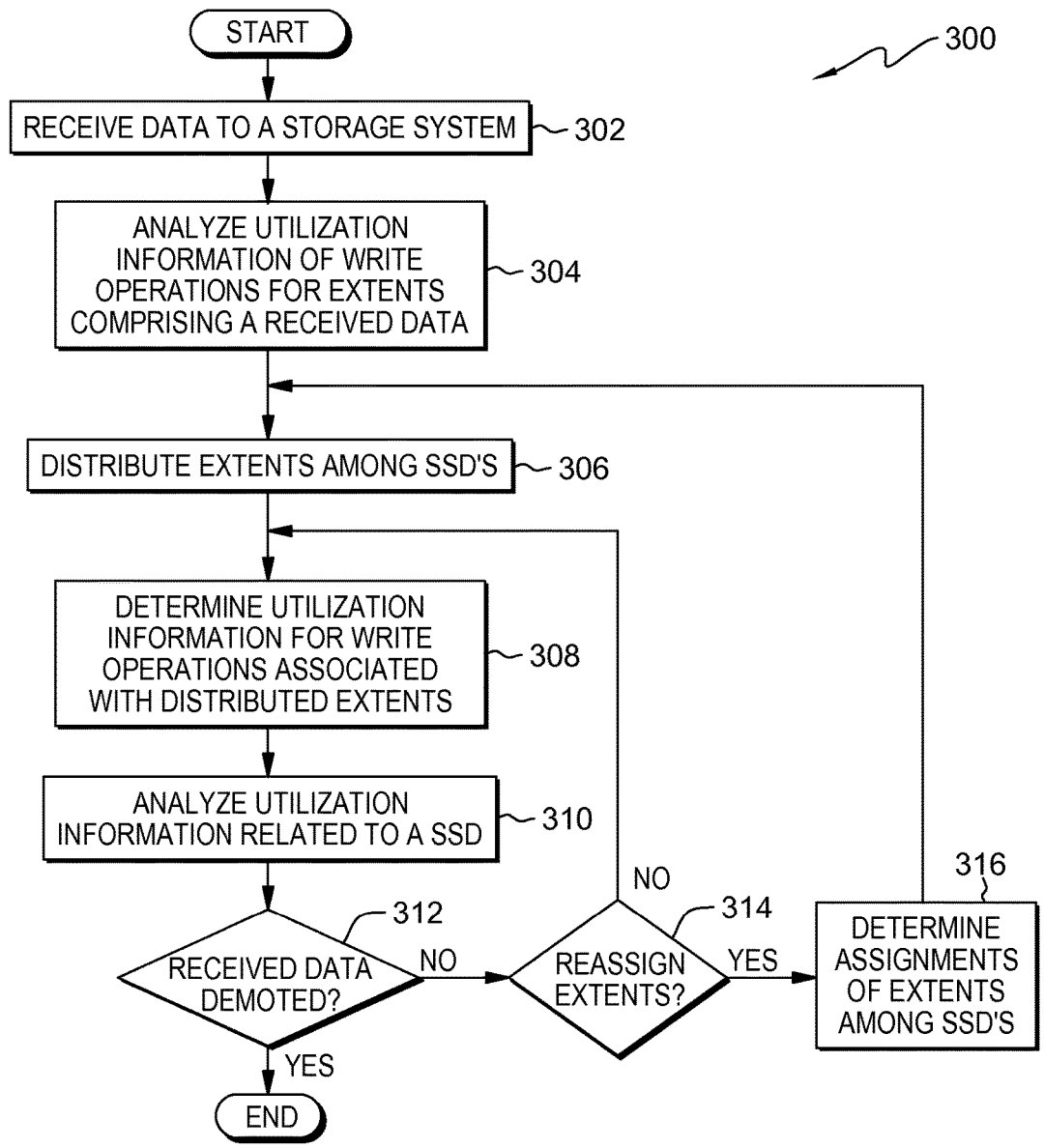
FIG. 3 depicts a flowchart of the operational steps of a solid-state drive data distribution program, in accordance with an embodiment of the present invention.

FIG. 3 is a flowchart depicting operational steps for SSD data distribution program 300, a program for determining which SSDs store one or more extents that comprise a received data, in accordance with embodiments of the present invention. In one embodiment, SSD data distribution program 300 determines assignments (e.g., SSDs) for extents that comprise a received data based on the analysis of the SSD utilization data and analyzed EWU information that corresponds to extents that comprise the received data. In another embodiment, SSD data distribution program 300 periodically reanalyzes the extent assignments based on EWU information corresponding to extents stored on SSDs. Subsequently, SSD data distribution program 300 may reassign one or more extents to other SSDs. In addition, SSD data distribution program 300 may update SSD statistics 106.

In step 302, SSD data distribution program 300 receives data to a storage system. In one embodiment, SSD data distribution program 300 delays receiving (migrating) the data from storage 150 while SSD data distribution program 300 analyzes the EWU information corresponding to the extents that comprise the migrated data and determines SSD assignments (step 304) for extents that comprise a received information. In another embodiment, SSD data distribution program 300 caches a received data. In one scenario, SSD data distribution program 300 caches a received data within system 102. In another scenario, SSD data distribution program 300 caches a received data within storage 140.

In an alternative embodiment, SSD data distribution program 300 obtains EWU information corresponding to the extents that comprise a data prior to system 102 receiving the data. In an example, SSD data distribution program 300 determines that client device 120 initiates a request (e.g., a database query, an initiation of a software program, etc.) on system 102 that utilizes data stored on storage 150. Subsequently, SSD data distribution program 300 obtains EWU information (e.g., from storage data statistics 104, from storage 150, etc.) corresponding to the extents that comprise the data associated with the request of client device 120.

In step 304, SSD data distribution program 300 analyzes utilization information of write operations for extents comprising a received data. In addition, SSD data distribution program 300 determines SSD assignments for the extents that comprise a received information based on EWU information for extents comprising a received data and information (e.g., from SSD statistics 106, from SSD endurance program 200, etc.) associated with a plurality of SSDs of storage 140. In one embodiment, SSD data distribution program 300 determines that storage 150 maintains a database on system 102 (e.g., storage data statistics 104) that includes EWU information and other historical information associated with data stored on storage 150. SSD data distribution program 300 analyzes the EWU information in storage data statistics 104 that corresponds to extents that comprise a received data. In another embodiment, SSD data distribution program 300 receives EWU information for the extents that comprise a received data included with the data received (e.g., migrated) from storage 150 to storage 140. In various embodiments, SSD data distribution program 300 queries storage 150 to obtain EWU information for the extents that comprise a received data (e.g., from storage 150).

In one embodiment, SSD data distribution program 300 analyzes the EWU information of extents that comprise a received database. In various embodiments, EWU information for each extent comprising a received data is ranked (e.g., ordered) from a highest EWU information (e.g., value) to a lowest EWU information. In an example (referring to FIG. 4a), table 400 depicts information associated with a received data, such as extent # and WPD-HDD values (e.g., EWU information) corresponding to each extent. Table 444 is the result of SSD data distribution program 300 ranking the extents of a received data. In one scenario, SSD data distribution program 300 may distribute hot extents to SSDs that comprise storage 142, and cold extents to SSDs that comprise storage 143 in a respective round-robin order, such as extent #407 to SSD 420, extent #414 to SSD 421, etc. In another scenario, SSD data distribution program 300 may distribute sequentially to a SSD while a total of EWD % of the assigned extents is less than or equal to a DWEV % that corresponds to the SSD. In various scenarios, SSD data distribution program 300 may utilize one or more other methods and/or algorithms to distribute extents that comprise a received data among an array of SSDs.

Referring to step 304 in another embodiment, SSD data distribution program 300 may determine SSD assignments (e.g., targets) for extents based on write operation utilization expressed as a percentage (i.e., EWD %) that corresponds to a SSD and a percentage that corresponds to each extent that comprises a received data. In an example (referring to FIG. 4a, table 444), SSD data distribution program 300 calculates an EWD %_HDD (e.g., extent write utilization % on storage 150) based on the WPD-HDD of an extent (e.g., 90 for extent #407) divided by the total WPD for the received data, 855 (e.g., element 445). SSD data distribution program 300 obtains DWEV % for each SSD from SSD statistics 106. For an extent (e.g., j thru k) and a SSD (e.g., 1 thru i), SSD data distribution program 300 may determine SSD assignments based on: $\Sigma_j^k$ EWD $\%_{HDD} < (\text{DWEV } \%_i * \Delta\text{UTIL})$. Where $\Delta\text{UTIL}$ is an overutilization value that may be defined as a rule within SSD statistics 106. Referring to the description for FIG. 4a, table 450 utilized a value for ΔUTIL of 1.15 (e.g., 15%). In some scenarios, SSD data distribution program 300 may utilize a ΔUTIL value of 1.0 (e.g., no overutilization). In other scenarios, SSD data distribution program 300 may utilize a ΔUTIL value of less than 1.0 (e.g., dictated underutilization).

In a further embodiment, SSD data distribution program 300 may determine whether an array of assigned SSDs (e.g., storage 142 and storage 143) includes a sufficient total DWEV to store a received data, for example: $\Sigma_1^j$ EWD_HDD<$\Sigma_1^i$ DWEV. In one scenario, if SSD data distribution program 300 determines that an array of assigned SSDs does not have sufficient total DWEV to store a received data, then system 102 may allocate one or more SSDs from storage 140 to storage 142 and/or storage 143. In another scenario, if SSD data distribution program 300 determines that an array of assigned SSDs does not have sufficient total DWEV to store a received data, then SSD data distribution program 300 may review a heat mapping index of the received data to determine one or more extents to demote.

In step 306, SSD data distribution program 300 distributes extents among SSDs. In one embodiment, SSD data distribution program 300 distributes (e.g., writes) the extents that comprise a received data to SSDs (e.g., of storage 142, of storage 143) based on SSD assignments determined by one or more analyses performed in step 304. In another embodiment, SSD data distribution program 300 distributes (e.g., writes) the extents that comprise data stored on SSDs that comprise storage 140 based on SSD assignments determined by one or more analyses performed in step 316.

In step 308, SSD data distribution program 300 determines utilization information for write operations associated with distributed extents. SSD data distribution program 300 utilizes one or more algorithms to determine EWU information corresponding to the distributed extents. SSD data distribution program 300 may determine write operation based utilization information on a periodic basis and/or based on a trend, such as an EMA. In one embodiment, SSD data distribution program 300 determines that the EWU information corresponding to the distributed extents is unchanged (e.g., a received data is not accessed). In various embodiments, SSD data distribution program 300 determines updated EWU information corresponding to the distributed extents. In one embodiment, SSD data distribution program 300 pauses at step 308, for a period of time, while a received data is accessed (e.g., read, updated, modified, etc.) and SSD data distribution program 300 determines utilization information based write operations associated with distributed extents. In another embodiment, SSD data distribution program 300 communicates EWU information of an extent to SSD endurance program 200 to update (referring to FIG. 2, step 204) a corresponding DWEV for a SSD that is assigned to (e.g., stores) the extent.

In another embodiment, SSD data distribution program 300 determines utilization information for write operations associated with distributed extents on a periodic basis and/or in response to an event, such as a change associated with a received data, information communicated from system 102, and/or information communicated from SSD endurance program 200. In one scenario, SSD data distribution program 300 determines EWU information associated with distributed extents in response to a loop initiated via the "No branch" of decision step 314. In another scenario, SSD data distribution program 300 determines EWU information associated with distributed extents in response to a loop initiated via the "Yes branch" of decision step 314 and step 316.

In step 310, SSD data distribution program 300 analyzes utilization information related to a SSD. In an embodiment, SSD data distribution program 300 obtains updated DWEV data from SSD endurance program 200. SSD data distribution program 300 determines one or more updated SSD utilization values based on corresponding DWEV data and obtained EWU information associated with distributed extents, such as but not limited to, DWEV %, Δ UTIL. %, Δ UTIL. STD, average total (e.g., group) SSD UTIL (SS-D_avgT_UTIL), and average individual SSD UTIL (SS-D_avgI_UTIL).

In various embodiments, SSD data distribution program 300 determines that one or more SSDs and/or a group of SSDs triggers a response based on one or more rules within SSD statistics 106.

In decision step 312, SSD data distribution program 300 determines whether received data is demoted. Demoted data is data that is migrated from higher performance tier storage (e.g., storage 140) to lower performance tier storage (e.g., storage 150). In one embodiment, SSD data distribution program 300 determines that received data is demoted based on a utilization (e.g., EWU information) analysis of information related to a SSD (e.g., utilization of stored extents) and one or more rules included on SSD statistics 106.

In some embodiments, SSD data distribution program 300 receives one or more indications that data stored within storage 140 is flagged for demotion. In one scenario, SSD data distribution program 300 determines that data is demoted based on receiving an indication that an application on client device 120 ceases to use the stored data. In another scenario, SSD data distribution program 300 determines that storage 140 is space constrained. SSD data distribution program 300 receives an indication from system 102 that data associated with a thread (e.g., program, user, etc.) of a higher priority is promoted. In response, SSD data distribution program 300 demotes a currently stored data. In some embodiments, SSD data distribution program 300 responds to commands (e.g., dictates) of a storage management program executing on system 102 and demotes (e.g., migrates) data from a SSD based storage tier (e.g., storage 140) to a non-SSD based storage tier (e.g., storage 150). In various embodiments, another entity (e.g., a server, a client device, a storage management program, etc.) may demote (e.g., migrate) data from a SSD based storage tier (e.g., storage 140) associated with SSD data distribution program 300 to a non-SSD based storage tier (e.g., storage 150).

In decision step 312, responsive to determining that received data is not demoted (No branch, decision step 312), SSD data distribution program 300 determines whether to reassign one or more extents. In an alternative embodiment, SSD data distribution program 300 determines that one or more extents included in a received data are demoted; however, some extents included in a received data remain stored among the SSDs of storage 140. In an example, SSD data distribution program 300 determines that one or more cold extents are demoted to free space in response to one or more extents stored in storage 150 that have increased in "hotness" and qualify for migration to storage 140. Responsive to determining that some extents included in a received data remain stored among the SSDs of storage 140 (No branch, decision step 312), SSD data distribution program 300 determines whether to reassign one or more extents.

In decision step 314, SSD data distribution program 300 determines whether to reassign one or more extents. In one embodiment, SSD data distribution program 300 determines to reassign one or more extents based on the analysis of EWU information of extents stored on a SSD, and the utilization (e.g., DWEV) of the SSD (step 310). In one scenario, SSD data distribution program 300 may determine to reassign one or more extents based on one or more rules of SSD statistics 106. In an example (referring to FIG. 4b, table 474), SSD statistics 106 includes a rule that dictates that an extent may be over utilized by 15%. However, SSD 421 is 22.3% over utilized (e.g., 4.68%/20.95%); therefore, SSD data distribution program 300 migrates one or more extents of SSD 421 to another SSD. In another scenario, SSD data distribution program 300 may receive an indication from SSD endurance program 200 that another set of data is received from storage 150 and that one or more SSDs (e.g., SSD 422) is over utilized (e.g., over drive capacity limit) (referring to FIG. 2, step 202). In an example (referring to FIG. 4a, table 450), SSD data distribution program 300 determines that SSD 423 is underutilized (e.g., Δ UTIL. % is −4.20%). SSD data distribution program 300 also determines that SSD 422 is also over utilized (e.g., Δ UTIL. % is 2.96%), and based on a reanalysis of the utilizations of the SSD (step 310), SSD data distribution program 300 reassigns extent 413 to SSD 423. A result of reassigning extent 413 from SSD 422 to SSD 423 is that Δ UTIL. % for SSD 423 increases and remains within a threshold dictated by a rule within SSD statistics 106, and Δ UTIL. STD decreases and satisfies another threshold dictated by another rule within SSD statistics 106.

Referring to decision step 314, in an alternative embodiment, SSD data distribution program 300 determines that one or more extents of a received data are demoted; however, some extents of a received data remain stored among the SSDs of storage 140 (decision step 312). In some embodiments, SSD data distribution program 300 demotes one or more extents of a stored data. In other embodiments, another entity (e.g., a server, a client device, a storage management program, etc.) demotes one or more extents of a stored data. SSD data distribution program 300 may reanalyze utilization information associated with one or more SSDs and EWU information corresponding to the remaining stored extents (step 310). SSD data distribution program 300 may determine to reassign one or more of the remaining stored extents among utilized SSDs.

In decision step 314, responsive to determining not to reassign one or more extents (No branch, decision step 314), SSD data distribution program 300 delays looping to step 308 based on one or more rules and/or conditions. In one embodiment, SSD data distribution program 300 loops on a periodic basis. In an example, SSD data distribution program 300 loops at six-hour intervals and determines another EWU information for each stored extent (step 308); and once per 24 hours, SSD data distribution program 300 determines a new EMA for the EWU information that corresponds to a plurality of stored extents. In another embodiment, SSD data distribution program 300 loops in response to detecting a change in the information associated with one or more extents. In an example, SSD data distribution program 300 determines, based on input from a data heat index mapping application, that one or more hot extents is identified as a cold extent and one or more cold extents is demoted. In some embodiments, SSD data distribution program 300 may loop in response to information communicated from SSD endurance program 200. In an alternative embodiment, SSD data distribution program 300 loops in response to information communicated from system 102 and/or client device 120.

In decision step 314, responsive to determining to reassign one or more extents (Yes branch, decision step 314), SSD data distribution program 300 determines assignments of extents among SSDs (step 316).

In step 316, SSD data distribution program 300 determines assignments of extents among SSDs. In one embodiment, SSD data distribution program 300 determines another assignment of extents among SSDs based on WPD values that correspond to each extent, utilization values corresponding to one or more SSDs, and algorithms and/or analyses utilizing one or more rules (e.g., dictates) included in SSD statistics 106. In an example (referring to FIG. 4a, table 450), SSD data distribution program 300 determines in step 310 that the Δ UTIL. STD is greater than a rule (e.g. threshold value). Subsequently, SSD data distribution program 300 determines another set of extent assignments (referring to FIG. 4a, table 454) that satisfies a rule (e.g. threshold value) within SSD statistics 106 for Δ UTIL. STD. In various embodiments, SSD data distribution program 300 determines another assignment of extents based on information provided by SSD endurance program 200. In one example, SSD data distribution program 300 determines another assignment of extents based on a removal of one or more SSDs from storage 142. In another example, SSD data distribution program 300 determines another assignment of extents based on storage 142 including one or more additional SSDs.

In another embodiment, SSD data distribution program 300 determines assignments of extents among SSDs based on one or more extents of a received data that are demoted. In an example, SSD data distribution program 300 may reanalyze utilization information related to a SSD (step 310) that previously included one or more extents that are demoted. In another example, SSD data distribution program 300 may reanalyze utilization information related to a group of SSDs (step 310) and determine one or more different SSD assignments for the extents that were not demoted. In an alternative embodiment, SSD data distribution program 300 determines another assignment in response to receiving a second data set (e.g., file, database) that utilizes one or more SSDs that include extents from an initial received data.

Referring to step 316 in other embodiments, SSD data distribution program 300 determines that a group of SSDs and/or an array of SSDs is rebalanced based on a SSD utilization analysis (step 310). In one embodiment, SSD data distribution program 300 determines that a received data is stored on an array of SSDs that have substantially similar drive endurance values. SSD data distribution program 300 generates a matrix (e.g., file, spreadsheet, etc.) based on sorting an array of SSDs in decreasing order of SSD_avgI_UTIL and extents stored within a SSD in order of decreasing WPD values. SSD data distribution program 300 may also include calculations that generate alternative SSD_avgI_UTIL values as potential extent reassignments are tested.

In one example, SSD data distribution program 300 utilizes a process (e.g., algorithm) that generates potential extent assignments based on swapping assignments of a hottest (e.g., highest EWU) extent of a SSD associated with the highest SSD_avgI_UTIL value with a coldest (e.g., lowest EWU) extent of a SSD associated with the lowest SSD_avgI_UTIL value and calculating another SSD_avgI_UTIL value for the SSDs engaged in swapping extents. If SSD data distribution program 300 determines that the new SSD_avgI_UTIL value corresponding to SSDs engaged in swapping extents is similar to (e.g., meets) SSD_avg- T_UTIL within a tolerance, then SSD data distribution program 300 selects another pair of hot and cold SSDs and repeats the process for the extents within the other pair of hot and cold SSDs.

If SSD data distribution program 300 determines that the new SSD_avgI_UTIL value corresponding to SSDs engaged in swapping extents is not similar to SSD_avgT_UTIL within a tolerance (e.g., is outside a threshold), then SSD data distribution program 300 swaps the assignments of extents with the assignments of the next hottest extent and the next coldest extent another pair of hot and cold SSDs and recalculates the SSD_avgI_UTIL value for the SSDs engaged in swapping extents repeats the process. Subsequently, SSD data distribution program 300 repeats the algorithm for each pair of hot/cold SSDs that have corresponding SSD_avgI_UTIL values that are not similar to SSD_avgT_UTIL within a tolerance. In response to determining alternative extent assignments generate SSD_avgI_UTIL values within a tolerance of SSD_avgT_UTIL, SSD data distribution program 300 loops to step 306 to distribute (e.g., transfer, migrate, etc.) the extents of the transferred data to the determined SSD assignments. In some embodiments, SSD data distribution program 300 may determine that SSD statistics 106 dictates that less than 100% of the SSDs obtain SSD_avgI_UTIL values within a tolerance of SSD_avgT_UTIL.

Referring to decision step 312, responsive to determining that received data is demoted (Yes branch, decision step 312), SSD data distribution program 300 terminates.

FIG. 4a depicts an illustrative example of data, comprised of extents, that is received from another storage system (e.g., storage 150) and distributed among solid-state drives (e.g., storage 142 and storage 143) based on the utilization of the extents on another storage system, in accordance with an embodiment of the present invention.

Table 400 is comprised of information related to data received from storage 150 (previously discussed in FIG. 1). In an example embodiment, table 400 indicates that the data received from storage 150 is comprised of sixteen extents that are listed in row 441. In this example, the extents are sequentially numbered 401 through 416 inclusively (i.e., 401, 402, 403, 404, 405, 406, 407, 408, 409, 410, 411, 412, 413, 414, 415, and 416). Row 442 identifies the recent EWU information corresponding to the extents that comprise the data received from storage 150. In an embodiment, the value for the utilization of an extent is defined with respect a number of write operations that occur per a unit of time. In this example, WPD-HDD, the header of row 442, signifies write operation per day on a HDD storage solution (e.g., storage 150). In some embodiments, the utilization is calculated based on an EMA algorithm. In other embodiments, different algorithms (e.g., mathematical, statistical) may be used to calculate the WPD-HDD values for the utilization of extents.

Row 442 of table 400 indicates that the utilization of the data received from storage 150 ranges from 10 WPD to 90 WPD. In this example embodiment, hot extents are identified as extents that have a utilization equal to or greater than 30 DWP, such as extents 401, 403, 407, 408, 409, 411, 412, 413, 414, 415, and 416. Cold extents are identified as extents that have a utilization less than 30 DWP, such as extents 402, 404, 405, 406, and 410.

In an embodiment, table 444 depicts an organization of extents when ranked from highest WPD to lowest WPD utilization values and the corresponding extent #s. Element 445 indicates the total WPD utilization for the data comprised of extents 401 through 416 inclusively (i.e., 401, 402, 403, 404, 405, 406, 407, 408, 409, 410, 411, 412, 413, 414, 415, and 416).

In one embodiment, table 450 is generated by applying a round-robin assignment (e.g., distribution) of the identified hot extents and the cold extents based the ranked values of the extents depicted in table 444 and the corresponding sorted groupings of SSDs (e.g., write-intensive SSDs, read-intensive SSDs). Based on an execution of SSD endurance program 200, the SSDs of storage 140 are separated into two groups, storage 142 and storage 143 (each previously discussed in FIG. 1). In addition, SSD endurance program 200 (referring to FIG. 2, step 208) sorts the SSDs within each group, highest DWPD endurance value to lowest DWPD endurance value. In this example, SSDs 420, 421, 422, and 423 are SSDs included in storage 142 for storing hot extents and SSDs 435, 436, and 437 are SSDs included in storage 143 for storing cold extents. Based on the total endurance values (e.g., remaining DWPD capacity) of the array of SSDs that includes SSDs 420, 421, 422, 423, 435, 436, and 437, row 451 depicts drive write endurance value percentages (DWEV %) associated with each SSD based on the total endurance values of the SSDs that comprise storage 142 and storage 143.

In another embodiment, SSD data distribution program 300 determines which extents are assigned to a SSD. Referring to table 450, in one embodiment, SSD data distribution program 300 determines, for example, that extents 407, 409, and 411 are assigned to SSD 420 based on one set of rules that assigns (e.g., distributes) extents among SSDs of a group (e.g., hot extents and cold extents). In an embodiment, table 450, row 453, includes a delta utilization percentage (Δ UTIL. %) for each SSD that store one or more extents; a negative value for Δ UTIL. % indicates that a SSD is over utilized. In another embodiment, row 453 also includes a calculated value for the standard deviation (STD) of the Δ UTIL. % of the array of SSDs. In an example, SSD data distribution program 300 performs an analysis of the distribution of extents (referring to FIG. 3, step 310) to determine the values that comprise row 453. Based on an embodiment that utilizes a round-robin distribution method for assigning extents, Δ UTIL. % of table 450, row 453 is 2.12%.

In various embodiments, SSD statistics 106 may include one or more criteria and/or one or more rules that dictate one or more values (e.g., a threshold, a range, etc.) associated with Δ UTIL. STD. In an example, SSD data distribution program 300 may determine after distributing extents (referring to FIG. 3, step 306) based on the SSD assignments of table 450 that one or more criteria and/or one or more rules included in SSD statistics 106 dictate that two or more extents are reassigned among the SSDs (referring to FIG. 3, Yes branch, decision step 314). An example of a criterion included in SSD statistics 106 is: if Δ UTIL. STD is greater than 2.0%, then reanalyze extent assignments. Subsequently, SSD data distribution program 300 executes one or more algorithms to determine another assignment of extents among the SSDs (referring to FIG. 3, step 316). In a further example, a result of SSD data distribution program 300 utilizing another algorithm that determines a different assignment of extents (referring to FIG. 3, step 316) among the SSDs is depicted within table 454. Row 455 includes calculated values for Δ UTIL. % and a Δ UTIL. STD based on the reassignment of extents among SSDs 420, 421, 422, 423, 435, 436, and 437. As depicted in table 454, the reassignment of extents generates a Δ UTIL. STD of 0.53%, an improvement of the Δ UTIL. STD value of 2.12% of table 450 and passes the above example criterion included in SSD statistics 106.

FIG. 4b depicts an illustrative example of the changes in the utilization of extents ((i.e., 401, 402, 403, 404, 405, 406, 407, 408, 409, 410, 411, 412, 413, 414, 415, and 416) that are stored on SSDs 420, 421, 422, 423, 435, 436, and 437, based on one or more applications (e.g., client device 120) processing the extents stored on SSDs of storage 142 and storage 143. FIG. 4b also includes a table that is generated by an embodiment that rebalances the distribution of the extents stored on the SSDs, in accordance with an embodiment of the present invention.

Table 460 is comprised of information related to extents 401 through 416 inclusively (i.e., 401, 402, 403, 404, 405, 406, 407, 408, 409, 410, 411, 412, 413, 414, 415, and 416) that are distributed (e.g., stored) among SSDs 420, 421, 422, 423, 435, 436, and 437, based on one or more applications processing the stored extents. For example, client device 120 may process a plurality of updates to a database where one or more records of the database comprise extents 401 through 416 inclusively. Table 460 is based on table 444 after a plurality of write and/or read operations process extents 401 through 416 inclusively. Row 462 depicts the utilization of the corresponding extents within row 461. In some embodiments, the utilization is calculated based on an EMA algorithm. In other embodiments, different algorithms (e.g., mathematical, statistical) may be used to calculate the WPD-SSD values for the utilization of extents. In this example, with respect to table 460, extents 407, 414, and 415 indicate a decreased utilization (e.g., lower respective values); extents 401, 411, 402, 410, 404, 405, and 406 have substantially similar utilization values; and extents 408, 416, 403, 409, 412, and 413 indicate increased utilization (e.g., higher respective values). In addition, in this depicted example, element 463 a total WPD-SSD value is higher that the WPD-HDD value depicted in element 445, 882.5 WPD as opposed to 855 WPD.

Referring to FIG. 4b, in an example embodiment, SSD data distribution program 300 (referring to FIG. 3, steps 308 and 310) and SSD endurance program 200 (referring to FIG. 2, step 202 and step 204) interact and update SSD statistics 106 for SSDs 420, 421, 422, 423, 435, 436, and 437. In one embodiment, the total write operations for each extent reduce the endurance values corresponding to a SSD that stored the corresponding extent. In one embodiment, based on the write operations associated with extents 401 through 416 inclusively, a utilization analysis executed by SSD data distribution program 300 (referring to FIG. 3, step 310) may produce table 470. Row 471 depicts the updated DWEV % corresponding to SSDs 420, 421, 422, 423, 435, 436, and 437. In this example, the utilization of SSDs 420, 422, and 437 increases, and the utilization of SSDs 421, 423, 435, and 436 decreases. Row 473 depicts the updated Δ UTIL. % and a Δ UTIL. STD values based on the change in utilization depicted in table 460 and the degradation of SSDs 420, 421, 422, 423, 435, 436, and 437 based on the corresponding write operations associated with the extents stored on the corresponding SSDs. In this example, Δ UTIL. STD of table 470 (i.e., 3.74%) is greater than Δ UTIL. STD of table 454 (i.e., 0.53) by a factor of 7.1. Based on an example rule in SSD statistics 106, such as if a Δ UTIL. STD of current utilization analysis is greater than a Δ UTIL. STD of a prior utilization analysis current by a factor of four or more (e.g., 7.1>4.0), then initiate a rebalancing algorithm on the stored extents.

In an embodiment, SSD data distribution program 300 (referring to FIG. 3, step 316) determines another assignment (e.g., executes a rebalancing algorithm) of extents among SSDs. In this example, a rebalancing algorithm produces table 474. As depicted in table 474, eleven of the sixteen extents (e.g., extents 407, 409, 408, 416, 403, 415, 404, 406, 410) that comprise the data received from storage 150 are reassigned to other SSDs of storage 140. Extents 411, 414, 401, 402, and 405 maintain the SSD assignments. Referring to row 475, the rebalancing of the extents generated a Δ UTIL. STD value of 1.02% and based on one or more example rules associated with SSD statistics 106, no further optimizations of extent assignments are dictated. In an embodiment, SSD data distribution program 300 distributes (e.g., migrates, transfers) the identified (e.g., reassigned) extents to the corresponding SSD (referring to FIG. 3, step 306).

Figure 5:
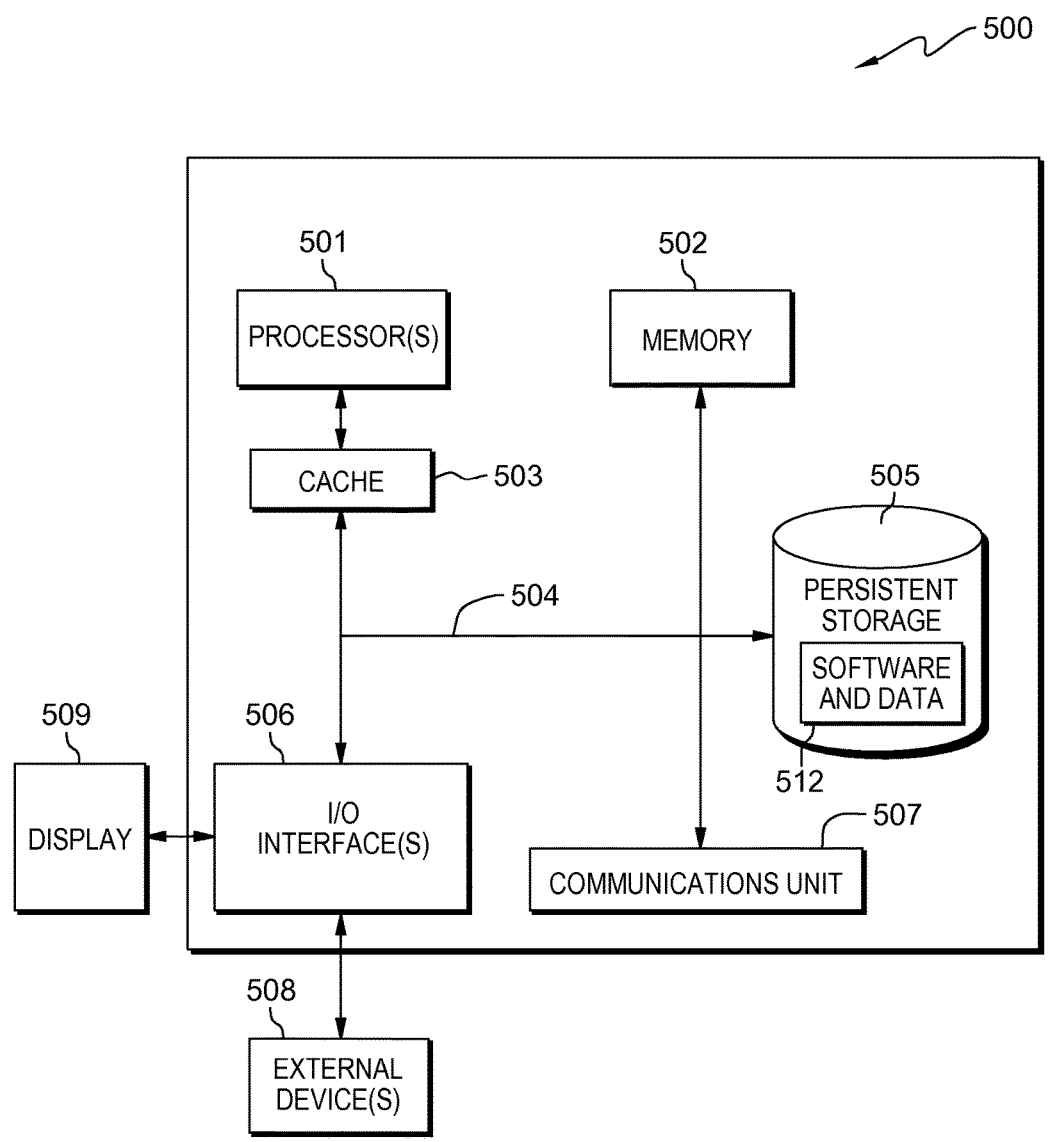
FIG. 5 is a block diagram of components of a computer, in accordance with an embodiment of the present invention.

FIG. 5 depicts computer system 500, which is representative of system 102, client device 120, and storage 150. Computer system 500 is an example of a system that includes software and data 512. Computer system 500 includes processor(s) 501, memory 502, cache 503, persistent storage 505, communications unit 507, I/O interface(s) 506, and communications fabric 504. Communications fabric 504 provides communications between memory 502, cache 503, persistent storage 505, communications unit 507, and I/O interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to system 102, software and data 512 includes storage data statistics 104, SSD statistics 106, SSD endurance program 200, and SSD data distribution program 300, and various programs (not shown). With respect to client device 120, software and data 512 includes various programs (not shown). With respect to storage 150, software and data 512 includes various information and programs (not shown).

Communications unit 507, in these examples, provides for communications with other data processing systems or devices, including resources of system 102, client device 120, and storage 150. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing data storage, the method comprising:
    identifying, by one or more computer processors, a plurality of first utilization values for data within a first data storage system, wherein the data includes a plurality of extents identified for storage among solid-state drives, and wherein the plurality of first utilization values corresponds to the plurality of extents included in the data, and wherein a utilization value is expressed as a quantity of write operations associated with an extent during a defined period of time;
    identifying, by one or more computer processors, a plurality of first endurance values corresponding to a plurality of solid-state drives (SSDs) of a second data storage system, wherein the plurality of first endurance values correspond to an estimated remaining drive-writes per day (DWPD) for respective SSDs, based on an original DWPD value for an SSD having been reduced by a plurality of write operations;
    transferring, by one or more computer processors, the data from the first data storage system to the second data storage system; and
    storing, by one or more computer processors, the plurality of extents of the transferred data among the plurality of SSDs based, at least in part on, a combination of first utilization values corresponding to transferred extents and the plurality of identified first endurance values corresponding to the plurality of SSDs of the second data storage system, wherein storing the plurality of extents further comprises:
    assigning, by one or more computer processors, one or more extents of the plurality of extents to a first SSD of the plurality of SSDs; and
    storing, by one or more computer processors, an entirety of the respective one or more extents assigned to the first SSD.

2. The method of claim 1, further comprising:
    determining, by one or more computer processors, the plurality of first utilization values based on the plurality of write operations corresponding to extents of the data stored on the first storage system;
    wherein a first utilization value is based on a plurality of write operations associated with an extent; and
    wherein the first utilization values are is calculated based on a trend associated with the plurality of write operations executed for the extent.

3. The method of claim 1, wherein assigning one or more extents of the plurality of extents to a SSD of plurality of SSDs further comprises:
    identifying, by one or more computer processors, one or more criteria for managing SSD wear within the second storage system; and
    determining, by one or more computer processors, a combination of assignments for the plurality of extents among the plurality of SSDs based on (i) the plurality of first utilization values, (ii) the determined plurality of first endurance values corresponding to the plurality of SSDs, and (iii) one or more criteria related to managing SSD wear based on comparing one or more combinations of assignments of one or more extents for storage among utilized SSDs, wherein at least one utilized SSD stores two or more extents.

4. The method of claim 1, further comprising:
    determining, by one or more computer processors, on a periodic basis, a plurality of second utilization values corresponding to the plurality of transferred extents stored among the plurality of SSDs of the second data storage system;
    determining, by one or more computer processors, a plurality of second endurance values for SSDs of the plurality of SSDs based, at least in part, on subtracting a value for the plurality of write operations executed for each extent of the transferred data from the plurality of first endurance values that correspond to SSDs of the plurality of SSDs that store one or more extents of the transferred data; and
    responsive to determining that the plurality of second utilization values and the plurality of second endurance values meets one or more first criteria, redistributing, by one or more computer processors, one or more extents of the plurality of extents among the plurality of SSDs such that one or more second criteria are met by one or more combinations of assignments of extents associated with the redistribution of the one or more extents; wherein redistributing includes transferring one or more extents among two or more SSDs.

5. The method of claim 4, further comprising:
determining, by one or more computer processors, a plurality of average utilization values for the plurality of SSDs that store the extents of the transferred data, based on the one or more extents assigned to each utilized SSD;
responsive to determining that at least one average utilization value of the determined plurality of average utilization values is outside of a threshold criteria relative to an average utilization value of the plurality of SSDs that store the extents of the transferred data, redistributing, by one or more computer processors, one or more extents of the plurality of extents among the plurality of SSDs based on the plurality of average utilization values for the plurality of SSDs that store the extents of the transferred data.

6. The method of claim 1, wherein the plurality of SSDs of the second storage system are assigned among two or more groups of SSDs based, at least in part, on the endurance value corresponding to each SSD of the plurality of SSDs.

7. The method of claim 6, wherein a group of SSDs is associated with a range of endurance values, and wherein each group of SSDs is utilized to store extents associated with a range of utilization values.

8. A computer program product for managing data storage, the computer program product comprising:
one or more computer readable storage media and program instructions stored on the one or more computer readable storage media, the program instructions readable/executable by one or more computer processors:
program instructions to identify a plurality of first utilization values for data within a first data storage system, wherein the data includes a plurality of extents identified for storage among solid-state drives, and wherein the plurality of first utilization values corresponds to the plurality of extents included in the data, and wherein a utilization value is expressed as a quantity of write operations associated with an extent during a defined duration of time;
program instructions to identify a plurality of first endurance values corresponding to a plurality of solid-state drives (SSDs) of a second data storage system, wherein the plurality of first endurance values correspond to an estimated remaining drive-writes per day (DWPD) for respective SSDs, based on an original DWPD value for an SSD having been reduced by a plurality of write operations;
program instructions to transfer the data from the first data storage system to the second data storage system; and
program instructions to store the plurality of extents of the transferred data among the plurality of SSDs based, at least in part on, a combination of first utilization values corresponding to transferred extents and the plurality of identified first endurance values corresponding to the plurality of SSDs of the second storage system, wherein program instructions to store the plurality of extents further comprises:
program instruction to assign one or more extents of the plurality of extents to a first SSD of the plurality of SSDs; and
program instructions to store an entirety of the respective one or more extents assigned to the first SSD.

9. The computer program product of claim 8, further comprising:
program instructions to determine the plurality of first utilization values based on the plurality of write operations corresponding to extents of the data stored on the first storage system;
wherein a first utilization value is based on a plurality of write operations associated with an extent; and
wherein the first utilization value is calculated based on a trend associated with the plurality of write operations executed for the extent.

10. The computer program product of claim 8, wherein program instructions to assign one or more extents of the plurality of extents to a SSD of the plurality of SSDs further comprises:
program instructions to identify one or more criteria for managing wear within the second storage system; and
program instructions to determine a combination of assignments for the plurality of extents among the plurality of SSDs based on (i) the plurality of first utilization values, (ii) the determined plurality of first endurance values corresponding to the plurality of SSDs, and (iii) one or more criteria related to managing SSD wear based on comparing one or more combinations of assignments of one or more extents for storage among utilized SSDs, wherein at least one utilized SSD stores two or more extents.

11. The computer program product of claim 8, further comprising:
program instructions to determine, on a periodic basis, a plurality of second utilization values corresponding to the plurality of transferred extents stored among the plurality of SSDs of the second data storage system;
program instructions to determine a plurality of second endurance values for SSDs of the plurality of SSDs based, at least in part, on subtracting a value for the plurality of write operations executed for each extent of the transferred data from the plurality of first endurance values that correspond to SSDs of the plurality of SSDs that store one or more extents of the transferred data; and
program instructions to respond to determining that the plurality of second utilization values and the plurality of second endurance values meets one or more first criteria by redistributing one or more extents of the plurality of extents among the plurality of SSDs such that one or more second criteria are met by one or more combinations of assignments of extents associated with the redistribution of the one or more extents, wherein redistributing includes transferring one or more extents among two or more SSDs.

12. The computer program product of claim 11, further comprising:
program instructions to determine a plurality of average utilization values for the plurality of SSDs that store the extents of the transferred data, based on the one or more extents assigned to each utilized SSD;
program instructions to respond to determining that at least one average utilization value of the determined plurality of average utilization values is outside of a threshold criteria relative to an average utilization value of the plurality of SSDs that store the extents of the transferred data by redistributing one or more extents of the plurality of extents among the plurality of SSDs based on the plurality of average utilization values for the plurality of SSDs that store the extents of the transferred data.

13. A computer system for managing data storage, the computer system comprising:

one or more computer processors;
one or more computer readable storage media;
program instructions stored on the computer readable storage media for execution by at least one of the one or more computer processors, the program instructions comprising:
program instructions to identify a plurality of first utilization values for data within a first data storage system, wherein the data includes a plurality of extents identified for storage among solid-state drives, and wherein the plurality of first utilization values corresponds to the plurality of extents included in the data, and wherein a utilization value is expressed as a quantity of write operations associated with an extent during a defined duration of time;
program instructions to identify a plurality of first endurance values corresponding to a plurality of solid-state drives (SSDs) of a second data storage system, wherein the plurality of first endurance values correspond to an estimated remaining drive-writes per day (DWPD) for respective SSDs, based on an original DWPD value for an SSD having been reduced by a plurality of write operations;
program instructions to transfer the date from the first data storage system to the second data storage system; and
program instructions to store the plurality of extents of the transferred data among the plurality of SSDs based, at least in part on, a combination of first utilization values corresponding to transferred extents and the plurality of identified first endurance values corresponding to the plurality of SSDs of the second storage system, wherein a SSD is assigned one or more extents, wherein program instructions to store the plurality of extents further comprises:
program instruction to assign one or more extents of the plurality of extents to a first SSD of the plurality of SSDs; and
program instructions to store an entirety of the respective one or more extents assigned to the first SSD.

14. The computer system of claim 13, further comprising:
program instructions to determine the plurality of first utilization values based on the plurality of write operations corresponding to extents of the data stored on the first storage system:
  wherein a first utilization value is based on a plurality of write operations associated with an extent;
  wherein the first utilization value is calculated based on a trend associated with the plurality of write operations executed for the extent.

15. The computer system of claim 13, wherein program instructions to assign one or more extents of the plurality of extents to a SSD of further comprises:

program instructions to identify one or more criteria for managing wear within the second storage system; and
program instructions to determine a combination of assignments for the plurality of SSDs based on (i) the plurality of first utilization values, (ii) the determined plurality of first endurance values corresponding to the plurality of SSDs, and (iii) one or more criteria related to managing SSD wear based on comparing one or more combinations of assignments of one or more extents for storage among utilized SSDs, wherein at least one utilized SSD stores two or more extents.

16. The computer system of claim 13, further comprising:
program instructions to determine, on a periodic basis, a plurality of second utilization values corresponding to the plurality of transferred extents stored among the SSDs of the second data storage system;
program instructions to determine a plurality of second endurance values for SSDs of the plurality of SSDs based, at least in part, on subtracting a value for the plurality of write operations executed for each extent of the transferred data from the plurality of first endurance values that correspond to SSDs of the plurality of SSDs that store one or more extents of the transferred data; and
program instructions to respond to determining that the plurality of second utilization values and the plurality of second endurance values meets one or more first criteria by redistributing one or more extents of the plurality of extents among the plurality of SSDs such that one or more second criteria are met by one or more combinations of assignments of extents associated with the redistribution of the one or more extents, wherein redistributing includes transferring one or more extents among two or more SSDs.

17. The computer system of claim 16, further comprising:
program instructions to determine a plurality of average utilization values for the plurality of SSDs that store the extents of the transferred data, based on the one or more extents assigned to each utilized SSD;
program instructions to respond to determining that at least one average utilization value of the determined plurality of average utilization values is outside of a threshold criteria relative to an average utilization value of the plurality of SSDs that store the extents of the transferred data by redistributing one or more extents of the plurality of extents among the plurality of SSDs based on the plurality of average utilization values for the plurality of SSDs that store the extents of the transferred data.

* * * * *